(12) United States Patent
Larsson et al.

(10) Patent No.: US 12,439,133 B2
(45) Date of Patent: Oct. 7, 2025

(54) SYSTEM AND METHOD FOR PROVIDING A RECOMMENDED VIDEO PRODUCTION

(71) Applicant: SPIIDEO AB, Malmö (SE)

(72) Inventors: Carl Larsson, Bjärred (SE); Patrik Olsson, Skanör (SE); Örjan Johansson, Lund (SE); Fredrik Ademar, Löddeköpinge (SE)

(73) Assignee: SPIIDEO AB, Malmo (SE)

(*) Notice: Subject to any disclaimer, the term of this patent is extended or adjusted under 35 U.S.C. 154(b) by 23 days.

(21) Appl. No.: 18/566,414

(22) PCT Filed: Jun. 2, 2022

(86) PCT No.: PCT/EP2022/065125
§ 371 (c)(1),
(2) Date: Dec. 1, 2023

(87) PCT Pub. No.: WO2022/253984
PCT Pub. Date: Dec. 8, 2022

(65) Prior Publication Data
US 2024/0298081 A1    Sep. 5, 2024

(30) Foreign Application Priority Data
Jun. 4, 2021   (EP) .................................. 21177734

(51) Int. Cl.
*H04N 21/854*   (2011.01)
*G06V 20/40*    (2022.01)
(Continued)

(52) U.S. Cl.
CPC .......... *H04N 21/854* (2013.01); *G06V 20/41* (2022.01); *H04N 21/21805* (2013.01); *H04N 21/23406* (2013.01)

(58) Field of Classification Search
CPC .......... H04N 21/854; H04N 21/21805; H04N 21/23406; H04N 5/222; H04N 21/2187; H04N 23/90; G06V 20/41; G11B 27/031
See application file for complete search history.

(56) References Cited

U.S. PATENT DOCUMENTS

| | | | | |
|---|---|---|---|---|
| 2007/0279494 | A1* | 12/2007 | Aman .................... | H04N 5/278 348/169 |
| 2014/0245367 | A1* | 8/2014 | Sasaki ................ | H04N 21/2343 725/109 |
| 2019/0109975 | A1 | 4/2019 | Linderoth et al. | |

FOREIGN PATENT DOCUMENTS

| | | |
|---|---|---|
| EP | 2428036 A1 | 3/2012 |
| EP | 2966851 A1 | 1/2016 |

OTHER PUBLICATIONS

International Search Report corresponding to PCT/EP2022/065125 mailed Sep. 26, 2022.

(Continued)

*Primary Examiner* — Alazar Tilahun
(74) *Attorney, Agent, or Firm* — Sandberg Phoenix & von Gontard PC

(57) ABSTRACT

A system (100) for providing a recommended video production (80) is disclosed herein. The system (100) comprises an overview camera (10) for capturing an overview recording, additional camera(s) (15a-n) for capturing additional recordings, and a back-end video production unit (44). The back-end video production unit is configured to receive the recordings being synchronized in time, apply image processing algorithm(s) to the overview recording for determining interest levels, wherein interest levels are associated with real-world events occurring within and around subareas of the real-world target field (20), select video contents among the recordings, wherein the selection is based on the interest levels as defined by the processed overview video (Continued)

recording, and based on said selection, produce the recommended video production (80) that, for each time unit, comprises video contents reflecting a currently highest interest level among the overview video recording and the additional video recording(s).

12 Claims, 9 Drawing Sheets

(51) Int. Cl.
*H04N 21/218* (2011.01)
*H04N 21/234* (2011.01)

(56) References Cited

OTHER PUBLICATIONS

Written Opinion corresponding to PCT/EP2022/065125 mailed Sep. 26, 2022.
International Preliminary Report on Patentability (with Annex) corresponding to PCT/EP2022/065125 dated Aug. 31, 2023.

\* cited by examiner

A method 200 for providing a recommended video production:

---

210
Capturing an overview video recording of a real-world target field (20), and outputting said overview video recording onto a data network (30)

---

220
Capturing one or more additional video recordings that cover a subarea of the real-world target field (20), and outputting said one or more additional video recordings onto the data network (30)

---

230
Receiving, from the data network (30), the overview video recording and the additional video recoring(s), wherein video contents of the overview video recording are synchronized with video contents of hte additional video recording(s)

---

235
Applying one or more image processing algorithms to the overview video recording for determining interest levels of subareas of the real-world target field (20), wherein interest levels are associated with real-world events occurring within and around subareas of the real-world target field (20)

---

240
Selecting video contents among the overview video recording and the additional video recording(s), said step of selecting being based on the interest levels as defined by the processed overview video recording

---

250
Based on said step of selecting, producing the recommended video production (80) that, for each time unit, comprises video contents reflecting a currently highest interest level among the overview video recording and the additional video recording(s)

*Fig. 7*

SYSTEM AND METHOD FOR PROVIDING A RECOMMENDED VIDEO PRODUCTION

CROSS-REFERENCE TO RELATED APPLICATIONS

This application is the US National Stage under 35 U.S.C. § 371 OF International App. No. PCT/EP2022/065125 filed 2 Jun. 2022 which claims priority to European App. No. 21177734.7 filed 4 Jun. 2021, both of said applications being incorporated herein by reference.

TECHNICAL FIELD

The present disclosure describes a system and an associated method of providing a recommended video production.

BACKGROUND

Popular real-world events, such as sports events or other recreational events with public interest, are typically being recorded by one or more video cameras. The recordings are then put together as a recommended video production, whereas the recommended production is streamed out to users so that they can enjoy the event as a live viewing experience.

As the technological expansion continues, the public demand for professional video productions are becoming higher and higher. This requires more video cameras for capturing the events from a plurality of different angles and perspectives, skilled professionals to operate the video cameras, effective video synchronization, optimized bandwidth usage, and so forth. Consequently, camera systems and video production systems are oftentimes expensive and complex. Moreover, viewers of video productions also expect increasingly improving video qualities, in terms of e.g. higher resolutions, lower latencies, and bigger event coverages. As such, some modern camera systems and video production systems that are adapted to record and produce recommended video productions reflecting real-world events apply intelligent video capturing and production means, so that no details of the events are overlooked or lost. However, different intelligent means, tools and schemes further add to the complexities and costs of the systems, and thus demands more on hardware requirement. For camera systems wherein a plurality of cameras covering different sections of the events are used, this is particularly costly and complex.

There is thus a need for providing a system that can produce high-quality video productions of real-world events, while keeping the complexity and costs for the system at a minimum.

SUMMARY

An object is therefore to provide a solution to, or at least a mitigation of, one or more of the problems or drawbacks identified in the background section above.

In a first aspect, a system for providing a recommended video production is provided. The system comprises an overview camera being adapted to capture an overview video recording of a real-world target field, and to output said overview video recording onto a data network; one or more additional video cameras, wherein each additional video camera is adapted to capture an additional video recording covering a subarea of the real-world target field, and to output said additional video recording onto the data network; and a back-end video production unit being connected to the data network, and configured to: receive the overview video recording captured by the overview camera and the additional video recording(s) captured by the one or more additional video cameras, wherein video contents of the overview video recording are synchronized in time with video contents of the additional video recording(s), apply one or more image processing algorithms to the overview video recording for determining interest levels of subareas of the real-world target field, wherein interest levels are associated with real-world events occurring within and around said subareas of the real-world target field, select video contents among the overview video recording and the additional video recording(s), said selection being based on the interest levels as defined by the processed overview video recording, and based on said selection, produce the recommended video production that, for each time unit, comprises video contents reflecting a currently highest interest level among the overview video recording and the additional video recording(s).

The system according to the first aspect enables extensive camera coverage of real-world target fields from a plurality of different angles and perspectives, while at the same time providing exceptional bandwidth usage. The selection between the overview recording and the additional recordings, depending on current interest levels of the field, provides users with a satisfactory viewing experience of a recommended video production. Moreover, the selection depending on interest levels allows for a relatively simplistic camera system to still provide an extensive camera coverage, which reduces costs. Yet additionally, camera angles and perspectives covered by any camera unit across and around the field that is interesting, even e.g. from personal phones, can be comprised in the recommended production.

In one or more embodiments, the back-end video production unit is configured to determine interest levels of subareas of the real-world target field by processing video contents of the additional video recording(s).

In one or more embodiments, at least one of the one or more of the additional video cameras comprises an edge computing unit, wherein the edge computing unit is configured to determine the interest level of the subarea covered by the associated additional video camera by processing video contents of the associated additional video recording.

In one or more embodiments, at least one of the additional video cameras is adapted to output pan-tilt-zoom (PTZ) data onto the data network, wherein the back-end video production unit is configured to receive the PTZ data, thereby enabling the video production unit to be aware of a position, an orientation, and a field of view for the associated additional video camera.

In one or more embodiments, the back-end video production unit is configured to select video contents by: upon the currently highest interest level satisfying an interest threshold criterion, selecting video contents of the additional video recording that cover the biggest portion of the subarea having the currently highest interest level based on said processed video contents of the overview video recording, and upon the currently highest interest level not satisfying the interest threshold criterion, selecting video contents of the overview video recording.

In one or more embodiments, the back-end video production unit is configured to store or buffer the recommended video production in a back-end video storage unit, and wherein the system further comprises: a back-end video streaming unit being configured to stream the recommended video production onto the data network; and a plurality of client devices being adapted to receive and present, on a display of each client device, the recommended video production.

In one or more embodiments, the back-end video streaming unit is configured to stream the recommended video production in different production formats based on the interest level of subareas of the real-world target field, each different production format being one of: a normal production, a rerun production, a highlight production, an augmented production, a commentary production, or a special events production.

In one or more embodiments, the back-end video production unit is configured to produce one or more additional video productions, wherein the back-end video streaming unit is configured to stream the one or more additional video productions onto the data network, and wherein the plurality of client devices are adapted to receive and present the one or more additional video productions on a display of each client device upon a user thereof having selected said one or more additional video productions for display.

In one or more embodiments, the one or more additional cameras are adapted to be activated, automatically aligned, or deactivated based on the interest level of the subarea covered by the associated additional video camera.

In one or more embodiments, the one or more additional cameras are adapted to adjust a capture resolution based on the interest level of the subarea covered by the associated additional video camera.

In one or more embodiments, the back-end video production unit is configured to provide capture accuracy feedback to the one or more additional video cameras through the data network.

In one or more embodiments, said one or more image processing algorithms involve providing a scoring scheme for said real-world events occurring within and around said subareas of the real-world target field.

In a second aspect, a method for providing a recommended video production is provided. The method comprises capturing an overview video recording of a real-world target field, and outputting said overview video recording onto a data network; capturing one or more additional video recordings that cover a subarea of the real-world target field, and outputting said one or more additional video recordings onto the data network; receiving, from the data network, the overview video recording and the additional video recording(s), wherein video contents of the overview video recording are synchronized in time with video contents of the additional video recording(s); applying one or more image processing algorithms to the overview video recording for determining interest levels of subareas of the real-world target field, wherein interest levels are associated with real-world events occurring within and around said subareas of the real-world target field; selecting video contents among the overview video recording and the additional video recording(s), said step of selecting being based on the interest levels as defined by the processed overview video recording, and based on said step of selecting, producing the recommended video production that, for each time unit, comprises video contents reflecting a currently highest interest level among the overview video recording and the additional video recording(s).

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 7 is a flowchart diagram illustrating a method for providing a recommended video production according to an embodiment.

DETAILED DESCRIPTION OF EMBODIMENTS

Figure 1A:
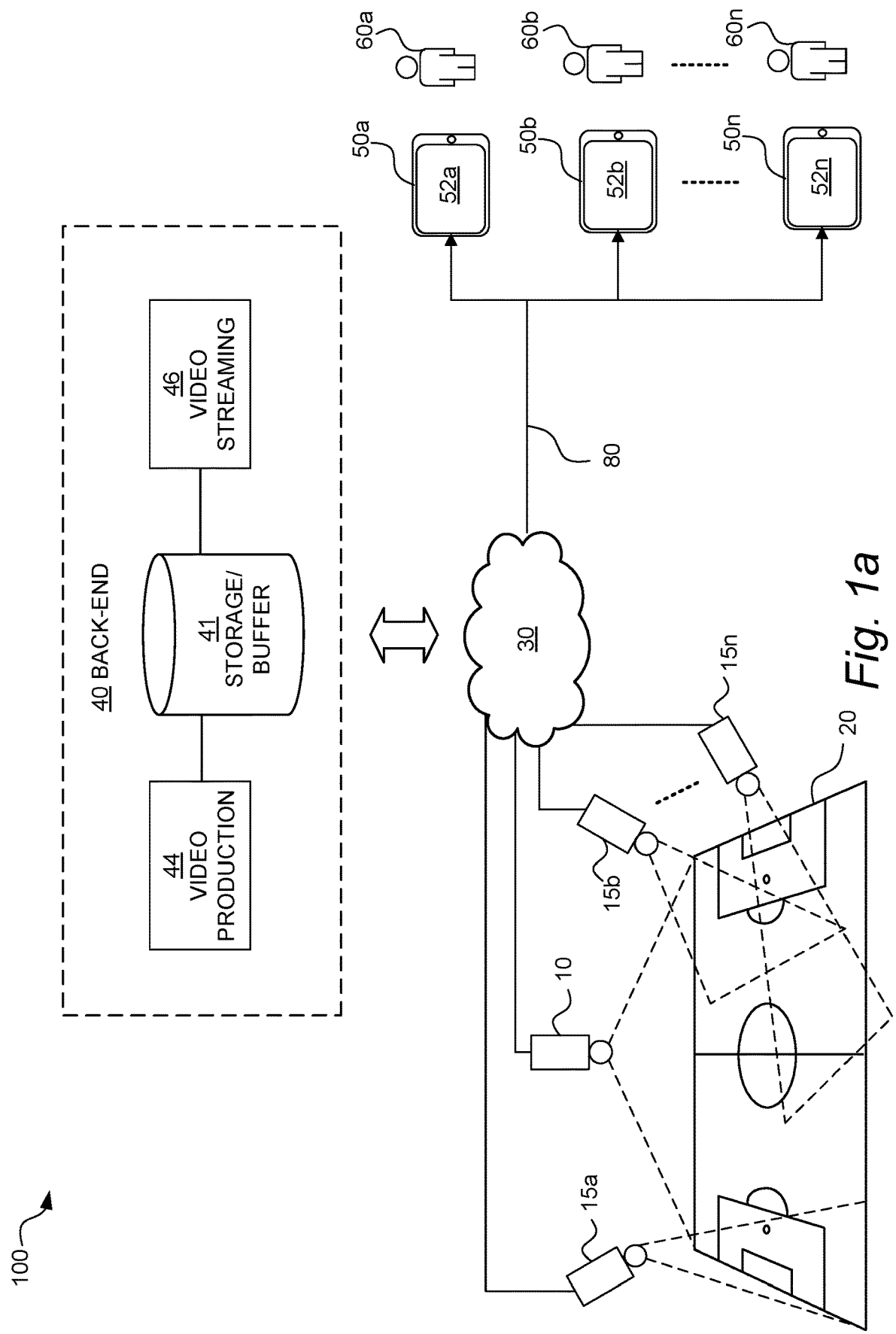
FIG. 1a is a schematic view of a system for providing a recommended video production to a plurality of users over a data network according to one embodiment.

Embodiments of the system will now be described with reference to the accompanying drawings. The system may, however, be embodied in many different forms and should not be construed as limited to the embodiments set forth herein; rather, these embodiments are provided so that this disclosure will be thorough and complete, and will fully convey the scope of the claimed invention to those skilled in the art. The terminology used in the detailed description of the particular embodiments illustrated in the accompanying drawings is not intended to be limiting of the claimed invention. In the drawings, like numbers refer to like elements.

FIG. 1a discloses an embodiment of a system 100 for providing a recommended video production 80 to a plurality of client devices 50a-n, operated by an associated user 60a-n, over a data network 30. The data network 30 may, for instance, be a wide-area network or aggregation of networks which form part of the Internet (commonly also referred to as the Cloud). The system 100 comprises an overview video camera 10 and one or more additional video cameras 15a-n being adapted to record different parts of a real-world target field 20 or subareas thereof. The system 100 further comprises a system back-end 40 being adapted to receive the recordings, select interesting video contents from the recordings, and produce the recommended video production 80.

The recommended video production 80 reflects real-world events occurring within and/or around the real-world target field 20, or subareas thereof. In the shown example, the real-world target field 20 is depicted as a football (soccer) arena. This is just an example, as the real-world target field 20 may practically be any type of field having events occurring thereon being associated with e.g. a sport or a recreational activity of public interest. For instance, the real-world target field 20 may alternatively be any other type of sports arena, a skiing slope, a skateboard park, a theatre hall, festival grounds, and so forth. A subarea thereof is thus to be interpreted as any portion, of an arbitrary size, of the real-world target field 20. Hence, a subarea may, for instance, be 1%, 10%, 50% or 90% of the entire real-world target field 20, one third of the rightmost penalty box, the northern supporter stands, the area surrounding one or more persons on the field 20, and so forth. One or more of the subareas may be overlapping at some portions of the real-world target field 20, or be completely separate from another.

The overview video camera 10 is adapted to capture an overview video recording of a real-world target field 20. The overview video recording is to be interpreted as a recording that covers the entire space of the real-world target field 20. The overview video camera 10 comprises means for outputting data, e.g. the captured overview video recording, onto the data network 30. For instance, data communication may be based on any long-range or short-range wireless communication standards known in the art, including but not limited to W-CDMA/HSPA, GSM, UTRAN, LTE, 3G, 4G, 5G, ZigBee, WirelessHART, WiFi, Bluetooth®, BLE, RFID, WLAN, mesh communication, to name a few. In one embodiment, the overview video camera 10 is an ultra-wide view network video camera, essentially covering the entire target field 20. Alternatively, the overview video camera 10 comprises a plurality of camera units operating in conjunction and positioned at approximately the same location for capturing respective views of the target field 20, the respective views being combined (stitched together) by the system back-end 40 into a single overview video recording of the target field 20.

Each of the one or more additional video cameras 15a-n is adapted to capture an additional video recording that covers a respective subarea of the target field 20. Each additional video camera 15a-n comprises communication means similar to those of the overview video camera 10. Hence, each of the one or more additional video cameras 15a-n is adapted to output the respective additional video recording onto the data network 30. Each of the one or more additional video cameras 15a-n may be adapted to operate autonomously, i.e. independently of the other additional video cameras 15a-n and the overview video camera 15. Hence, each additional video camera 15a-n may be implemented to output the associated additional video recording according to best-effort delivery practice. In different embodiments, the one or more additional video cameras 15a-n may be either one or a combination of PTZ cameras, mobile phone cameras, compact cameras, DSLR cameras, action cameras, drone cameras, spidercams, 4K/HD live cameras, HD system cameras, HD/SD system cameras, or any other type of camera that can be adapted to cover a subarea of a real-world target field and output the recording onto a data network.

In some embodiments, the overview video camera 10 is different from the one or more additional video cameras 15a-n.

In some embodiments, the capture resolution associated with the overview video camera 10 is different from the one or more additional video cameras 15a-n. For instance, the capture resolution associated with the overview video camera 10 may be lower than the capture resolution associated with the one or more additional video cameras 15a-n. The overview video camera 10 can thus be arranged to capture the entirety of the real-world target field 20 with a lesser level of detail in order to obtain a full view such that bandwidth savings can be made. These embodiments may be useful for determining interest levels of the overview video recording and, based on said processed overview video recording, selecting video contents that is best able to reproduce interesting events on the real-world target field 20. This will be discussed in more detail with reference to FIG. 2.

In the exemplary FIG. 1a, the system 100 comprises one overview video camera 10 and an arbitrary number of additional video cameras 15a-n. The overview video camera 10 may be positioned to cover the entire real-world target field 20. The additional video cameras 15a-n are, on the other hand, positioned at different locations around the real-world target field. A first additional video camera 15a may for instance be a mobile phone camera held by a person standing at the northern supporter stands, and directed so that the left penalty box is generally covered. For this camera 15a, the approximate area of the left penalty box is to be seen as a subarea of the real-world target field 20. A second additional video camera 15b may for instance be a 4K/HD live camera manually operated by a camera operator, and directed to cover one or more players at the field 20. For this camera 15b, the approximate area of the middle of the right half of the field 20 is to be seen as the real-world target field 15b. Additional video cameras 15n may, similar to the first and second additional cameras 15a-b, be any one of the previously mentioned camera types and positioned to cover subareas of the field 20. If two or more of the additional video cameras 15a-n are mounted close to each other with overlapping fields of view, the captured frames can be stitched together by the system back-end 40 and used as if captured by a single camera with a wide field of view. Additional video cameras 15n view cameras may, for instance, be mounted near the two goals at either sides of the field 20, thereby serving to provide close-up video views of football action near the goals.

The recording acquired by the overview video camera 10 and each of the additional video cameras 15a-n may comprise respective raw video segments that are outputted onto the data network 30. Each such raw video segment may contain recorded video contents, for instance, in the form of H.264 or H.265 encoded video data. In one embodiment each raw video segment comprises recorded video contents in the form of H.264 encoded video data.

The system back-end 40 is adapted to act as a service bridge between the video cameras 10, 15a-n and the users 60a-60n via the data network 30. The back-end 40 may be implemented as a cloud-based server implemented by known technologies, such as Amazon Web Services, Google Cloud Platform, Microsoft Azure, DigitalOcean, Oracle Cloud Infrastructure, IBM Bluemix or Alibaba Cloud. The cloud-based server may be included in a distributed cloud network that is widely and publically available, or alternatively limited to an enterprise. Other alternative server configurations may be realized based on any type of client-server or peer-to-peer (P2P) architecture. Server configurations may thus involve any combination of e.g. web servers, database servers, email servers, web proxy servers, DNS servers, FTP servers, file servers, DHCP servers, to name a few.

As seen in FIG. 1a, the system back-end 40 comprises a number of units (or modules, or devices) which shall be seen as functional elements rather than structural or physical; they may be structurally implemented for instance by one or more server computers with suitable operating system, software and networking access capabilities.

The back-end 40 comprises a back-end video production unit 44. The video production unit 44 is connected to the data network 30 and configured to receive the overview video recording and the additional video recording(s). The video production unit 44 may be configured to receive video recordings continuously as soon as the cameras 10, 15a-n have outputted the recordings onto the data network 30. For embodiments wherein each additional video camera 15a-n is operating autonomously according to best-effort delivery, video contents among the overview recording and the additional recordings are synchronized in time. Synchronization techniques for video contents are well known in the art, and will thus not be given attention herein.

In embodiments of the present disclosure, the back-end video production unit 44 may be configured to store or buffer the recommended video production 80 in a back-end video storage unit 41. The back-end video storage unit 41 may be any media suitable for storing digital video contents and metadata, such as PTZ data, of one or more additional video cameras 15a-n. For instance, the back-end video storage unit 41 may be implemented as one or more magnetic hard disks, solid state drives or random access memories, included in or connected to (locally or via the data network 30) any of the units of the system back-end 40. Moreover, the system back-end 40 may comprise a back-end video streaming unit 46 that is configured to stream the recommended video production 80 onto the data network 30. The streaming may be made according to any commercially available standard, for instance, being based on H.264 video encoding.

In embodiments of the present disclosure, each one of the plurality of client devices 50a-n may be adapted to receive and present, on the associated display 52a-n, the recommended video production 80. The plurality of client devices 50a-n may be used by the plurality of users 60a-n. Each client device 50a-n may, for instance, be implemented as a mobile terminal (e.g. smartphone), a tablet computer, a smart watch, a personal computer, etc. Each client device 50a-n comprises suitable networking interface, such as IEEE 808.11, UMTS, LTE, etc. Each client device 50a-n also comprises suitable video decoding capabilities, e.g. for H.264 video decoding.

Upon the video production unit 44 receiving the overview video recording and the one or more additional video recordings from the cameras 10, 15a-n, the video production unit 44 is configured to select video contents to be used for producing a video production. As will become apparent from the forthcoming embodiments, video content selection may be based on a variety of different insightful considerations, none of which is necessarily to be interpreted as more advantageous than the other. Selection of video contents in accordance with the embodiments as will be described herein effectively provides a system that can produce high-quality video productions of real-world events, while keeping the complexity and costs for the system at a minimum.

In either one of the embodiments as will be presented herein, the selection of video contents is determined by interest levels of subareas of the real-world target field 20. An interest level is associated with real-world events occurring within and around subareas of the real-world target field 20. For instance, an interest level may be related to how interesting a real-world event is in relation to other events, how many or few real-world events are occurring at different locations, what type of real-world event is occurring, for how long a real-world event is occurring, consequences of real-world events, and so forth.

Interest levels of the video contents, or metadata associated with the video contents, is analyzed to determine one or more image elements in the video contents. The image elements may be associated with persons and/or objects in the scene, and the number of image elements in a subarea in relation to how relevant they are may determine an overall interest level of a subarea. The video contents comprises a plurality of digital images, each image being defined as a function $f(x, y)$, where x, y are spatial coordinates and the amplitude of $f$ at any pair of coordinates (x, y) represents an image intensity at that particular point. The amplitude of the images typically holds color values in the RGB range between 0-255, respectively, determining a pixel value or depth of the image. Upon determining interest levels of the video contents, the pixels are analyzed for retrieving information relating to scene occurrences. For instance, a black pixel value (RGB (0, 0, 0)) is typically not considered interesting.

The procedure of determining interest levels is, per se, well known in the art and can be realized by known image processing algorithms. In this disclosure, said image processing algorithms are applied to the real-world target field 20 and real-world events occurring therein in an inventive manner.

A real-world event may practically be any type of event that commonly occurs at real-world fields, and is by no means restricted to a particular type of real-world event. For instance in the example of a football stadium, a real-world event may be a goal, a player or coach performing some action, where the ball is located, commotions, corner kicks, free kicks, penalties, crowds, injuries, to name a few. Other examples of real-world events may be realized for other types of real-world target fields 20. In general, subareas of the real-world field 20 wherein more than one real-world event is occurring at a given time are more interesting than other subareas wherein zero or just one real-world event is occurring, although variations may be realized.

A general concept of the present disclosure is thus to, for each time unit (e.g. each ns, µs, s, or generally any arbitrary period of time), make a decision regarding which of the video contents in the overview video recording or the additional video recording(s) that currently reflects the highest interest level, and select said video contents. Based on the selection, the back-end video production unit 44 is configured to produce a recommended video production 80 that preferably and as often as possible reflects the most interesting portions of the real-world target field 20.

Figure 1B:
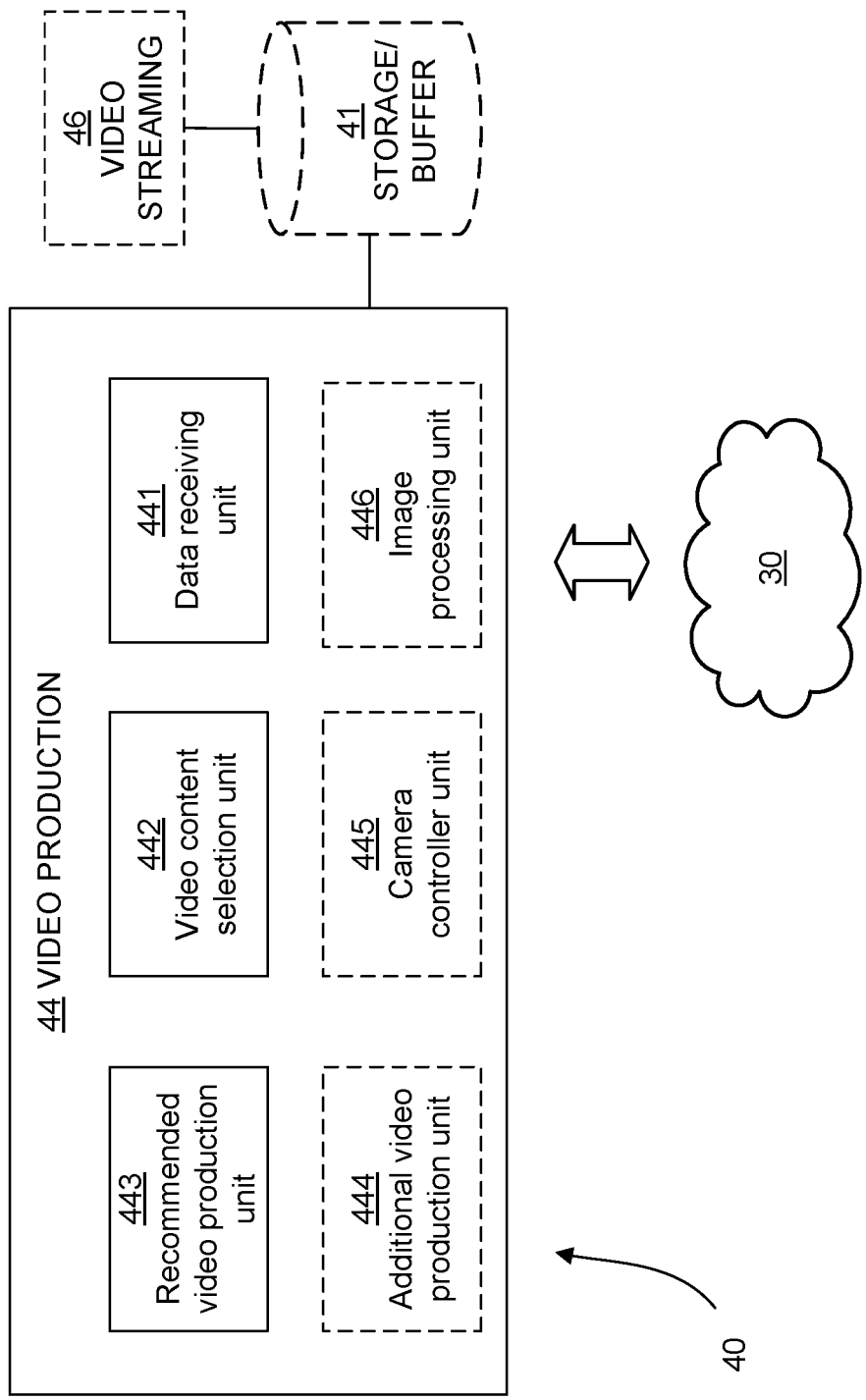
FIG. 1b is a schematic block diagram of a system back-end according to one embodiment.

FIG. 1b is a schematic block diagram of the system back-end 40 according to one embodiment. The system back-end 40 shown in FIG. 1b is a detailed view of some of the components that may be comprised in the back-end video production unit 44. The units 441-443 being indicated in solid boxes are to be interpreted as being included in preferred embodiments of the present disclosure. The units being indicated in dashed boxes 444-446 are to be interpreted as being included in embodiments having a more optional character. Nevertheless, the back-end video production unit 44 is not restricted to having some or all of these units, as alternative units may be realized by the person skilled in the art. Moreover, the skilled person realizes that some of the functionalities caused by some of the units may be included in other units.

The back-end video production unit 44 comprises a data receiving unit 441. The data receiving unit 441 is configured to receive data from the data network 30. The received data may correspond to either one of the additional video recording(s) or the overview video recording. Moreover, the data receiving unit 441 may be configured to receive PTZ data of cameras associated with the system 100. Additionally, the data receiving unit 441 may be configured to receive any other type of data, such as e.g. metadata, set-up data, installation data, and so forth.

The back-end video production unit 44 further comprises a video content selection unit 442. The video content unit 442 is configured to select video contents among the received overview video recording and the additional video recording(s). The selection is based on or determined by interest levels of subareas of the real-world target field 20. Video content selection according to different embodiments will be further explained later on with reference to FIGS. 2 and 3*a-e*.

The back-end video production unit 44 further comprises a recommended video production unit 443. The recommended video production unit 443 is configured to produce the recommended video production 80 based on the selection made by the video content selection unit 442. Accordingly, the recommended video production 80 will comprise video contents reflecting a currently highest interest level among the recordings received by the data receiving unit 441.

The back-end video production unit 44 may further comprise an additional video production unit 444. The additional video production unit 444 may be configured to produce additional video productions being of lesser interest, but nonetheless of some interest. This will be further explained with reference to FIG. 5.

The back-end video production unit 44 may further comprise a camera controller unit 445. The camera controller unit 445 may be configured to control different operations of the overview camera 10 and/or the additional camera(s) 15*a-n*. Such operations may, for instance, include providing capture accuracy feedback, adapt the resolution of either one of the cameras 10, 15*a-n*, or deactivate, activate or automatically align the orientation or position of either one of the cameras 10, 15*a-n*.

In embodiments of the present disclosure, the camera controller unit 445 may be configured to activate, automatically align, or deactivate the or more additional video cameras 15*a-n* based on the interest level of the subarea covered by the associated additional video camera 15*a-n*. Activation and/or deactivation may be performed by the additional video camera 15*a-n* itself, as instructed by the camera controller unit 445. Accordingly, the total bandwidth requirement of the system 100 may be reduced. Similarly, if there is/are some subarea(s) of the target field 20 that is/are currently not being covered by any additional camera 15*a-n* but nevertheless should be covered (e.g. based on the processed overview video recording), the camera controller unit 445 may activate or automatically align the one or more additional camera(s), so that it/they appropriately cover(s) the subarea(s) of interest. The quality and/or coverage of the recommended video production 80 may thus be improved.

In embodiments of the present disclosure, the camera controller unit 445 may be configured to adjust a capture resolution of the one or more additional video cameras 15*a-n* based on the interest level of the subarea covered by the associated additional video camera 15. Similar to the above discussed embodiments of activation, alignment or deactivation, the adjusting of capture resolution may be enabled by each camera 15*a-n* itself as instructed by the camera controller unit 445. For instance, each additional video camera(s) 15*a-n* currently not capturing video contents that reflect the highest interest level may deliberately have its capture resolution lowered in order to reduce bandwidth requirements. Similarly, the additional video camera currently capturing video contents that reflect the highest interest level may on the other hand have its capture resolution improved. Hence, the quality of the recommended video production 80, as perceived by users, is not negatively affected.

In embodiments of the present disclosure, the camera controller unit 445 may be configured to provide capture accuracy feedback to the one or more additional video cameras 15*a-n* through the data network 30. Feedback is related to how well the camera(s) 15*a-n* are able to cover the subareas of interest. For instance, upon the back-end video production unit 44 having processed video contents of the recording(s), the video production unit 44 may discover that any of the additional video camera(s) 15*a-n* has potential to improve its capture accuracy. Accordingly, the feedback may provide instructions for the camera(s) 15*a-n* of how to more accurately cover subareas of interest being of higher relevance (interest level).

The back-end video production unit 44 may further comprise an image processing unit 446. The image processing unit 446 may be configured to determine interest levels of subareas by applying one or more image processing algorithms. The image processing algorithm(s) may be applied to video contents of the overview video recording and/or the additional video recording(s) (e.g. raw video frames thereof). The image processing unit may alternatively be comprised in the overview video camera 10 and/or any one of the additional video camera(s) 15*a-n*. The applied image processing algorithms may be based on known algorithms for detecting patterns, objects, occurrences, pixels, etc., in video-recorded contents. Image processing algorithms are well known in the art and may, for instance, be based on classification, feature extraction, multi-scale signal analysis, pattern recognition, projection, neural networks, point feature matching, principal component analyses or self-organizing maps, to name a few.

In embodiments of the present disclosure, the one or more image processing algorithms may be configured to provide a scoring scheme for real-world events occurring within and around subareas of the real-world target field 20. Scoring schemes may be used to determine how one real-world event can be more or less interesting than another. To this end, the image processing algorithm may associate a certain event with a nominal value, wherein the nominal value depends on what type of event it is. The scoring schemes may further involve accumulating nominal values for real-world events occurring in different subareas of the real-world target field. This makes it possible to distinguish subareas of different interest levels based on the accumulated nominal values for each subarea of interest. This will be further explained with reference to FIG. 2.

Figure 2:
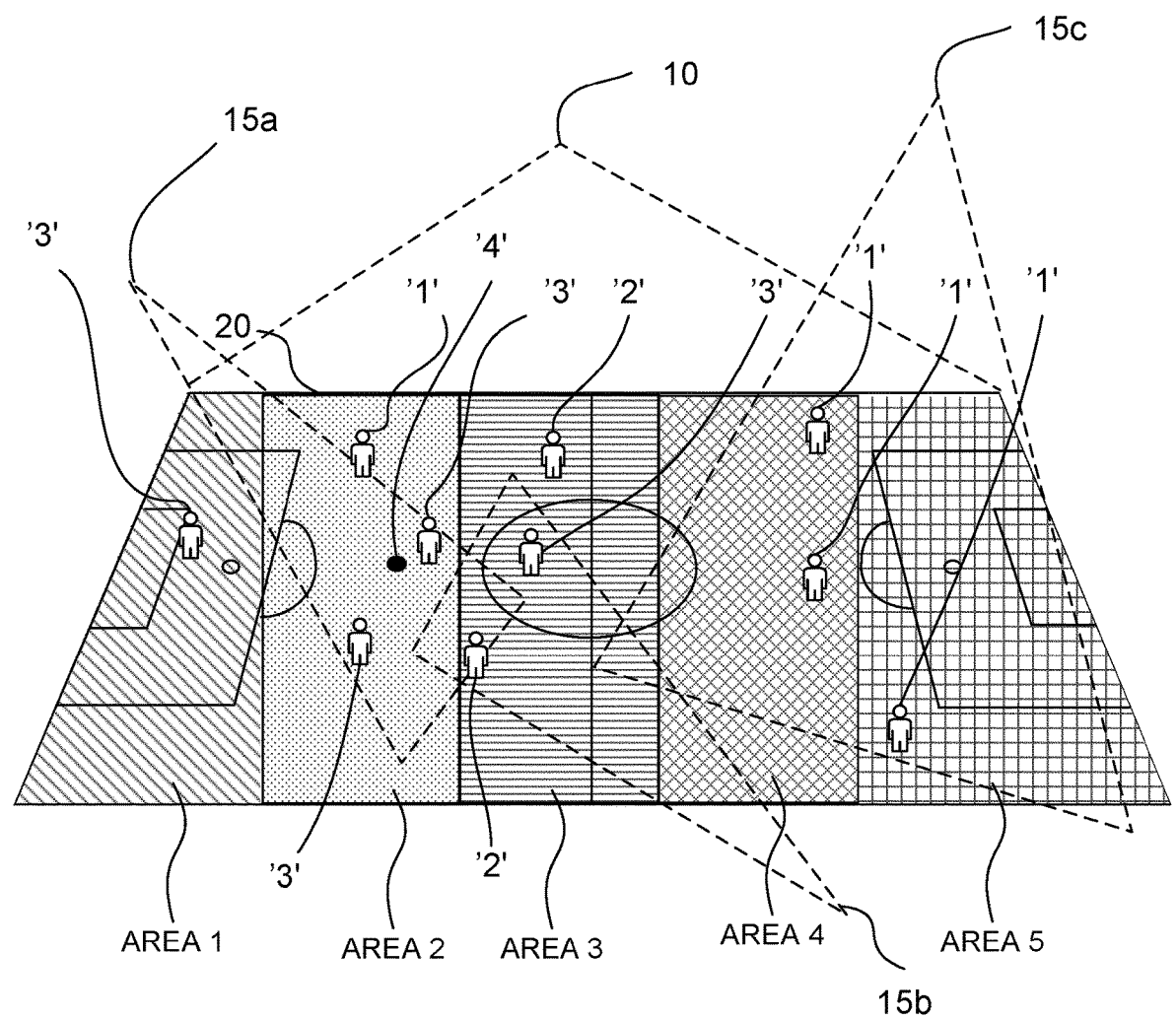
FIG. 2 is an illustrative image of determining subareas of interest of a real-world target field according to an embodiment.

FIG. 2 shows an embodiment of determining subareas of interest of a real-world target field 20 based on occurring real-world events, and how subareas of interest are used for selecting video contents. The back-end video production unit 44 is configured to determine interest levels of subareas by processing video contents of the overview video recording. The image processing unit has determined a total of five interesting subareas, denoted AREA 1, AREA 2, AREA 3, AREA 4, and AREA 5. In this example, the five subareas cover the entire real-world field 20 together, although in other examples any number of subareas can be realized that do not necessarily cover the entire field 20. For each subarea, events occurring therein have been given a nominal value representing the level of interest. As can be seen from the illustration in FIG. 2, what is happening to the ball is currently considered to be the most interesting event on the field, and it has thus been given a value of '4'. The player closest to the ball is also interesting, and has been given a value of '3'. Other players on the field 20 have been given other nominal values, depending on e.g. what they are doing, who they are, and/or how involved with the ball and/or other events they are. AREA 2 is thus considered to be the most interesting subarea, considering that it comprises three players and a ball and thus has an accumulated nominal value of '11'.

As levels of interest have been determined for subareas of the real-world target field 20, the back-end video production unit 44 is configured to select video contents among the video recordings. Selecting video contents is based on the processed video contents of the overview video recording. In addition to an overview video camera 10 capturing a recording of the entire real-world field 20, FIG. 2 also shows three additional video cameras 15a-c, each being positioned to cover a respective subarea of the field 20. Note that the subareas covered by the additional video cameras 15a-c do not necessarily correspond to the subareas having determined interest levels, as in this example wherein they rather overlap at some portions than equate.

In order to select video contents, the back-end video production unit 44 may be configured to set an interest threshold criterion. The interest threshold criterion may, for instance, correlate to a ratio between total camera coverage and camera coverage within the subarea of interest. Alternatively, the interest threshold criterion may correlate to total camera coverage of the subarea of interest. Yet alternatively, the interest threshold criterion may be any suitable criterion for selection between two or more video recordings. The person skilled in the art may realize alternative selection schemes not necessarily being based on an interest threshold criterion, provided that the selected video contents reflect the currently highest interest level of the real-world target field 20.

The interest threshold criterion determines whether to select video contents from the overview video recording or either one of the additional video recordings. Accordingly, when the currently highest interest level satisfies the interest threshold criterion, video contents of the additional video recording that covers the biggest portion of the subarea having the currently highest interest level may be selected. Conversely, when the currently highest interest level does not satisfy the interest threshold criterion, video contents of the overview video recording may be selected. This can broadly be interpreted as always selecting the most relevant video recording. If one of the additional video recordings comprises video contents of better, more relevant, or in some way advantageous quality than the overview video recording, the currently highest interest level is deemed to satisfy the criterion. If neither one of the additional video recordings do so, however, the currently highest interest level is not deemed to satisfy the criterion. Consequently, video contents of the overview video recording are selected.

The video processing, interest level determination and video content selection scheme as discussed above is particularly advantageous in several aspects. The scheme makes it possible for the system 100 to, in a first step, only analyze one single overview camera recording in order to determine what is interesting on the real-world target field 20. It is not required to analyze each one of the cameras 15a-n stationed around the field 20. The system 100 may thus produce a recommended video recording having an extensive camera coverage of the real-world target field 20 from a plurality of different angles and perspective, while at the same time providing an exceptional bandwidth usage. An overview camera 10 with low display resolution can possibly be used to determine interest levels of the entire field without sacrificing part(s) of the scene. Then, once interest levels have been determined, the camera view selection made will improve the representation of local details, since the real-world occurrences may be reproduced with a better capture resolution/coverage than by the overview video camera 10. An example of this will now be shown and explained with further reference to FIG. 2.

In FIG. 2, each one of AREAS 1-5 is covering 20% of the real-world target field 20, and AREA 2 has been determined to represent the subarea having the currently highest interest level. At the particular time unit seen in FIG. 1a, the first additional camera 15a covers approximately 10% of AREA 1, 60% of AREA 2 and 10% of AREA 3. The second additional camera 15b covers approximately 5% of AREA 2, 60% of AREA 3 and 10% of AREA 4. Finally, the third additional camera 15c covers approximately 5% of AREA 3, 60% of AREA 4 and 90% of AREA 5. If total camera coverage of the subarea of interest is used as the interest threshold criterion, the video contents of the overview video recording will be selected as the content for production. This is because the overview video camera 10 covers 100% of AREA 2, whereas the additional video cameras 15a-c cover 60%, 5% and 0%, respectively, of AREA 2. For this particular interest threshold criterion, the additional video recordings are not deemed to be more relevant than the overview video recording, and the currently highest interest level is thus not seen to satisfy the interest threshold criterion. The results would obviously be different if the overview video recording were to be processed differently, e.g. by analyzing alternative subareas of interest or by events on the field 20 occurring differently.

However, if a ratio between total camera coverage and camera coverage within the subarea of interest is used as the interest threshold criterion, the video contents of the first additional camera 15a will be selected as the content for production. This is due to the fact that only (0.2/(0.2+0.2+0.2+0.2+0.2))=20% of the overview video recording is covering AREA 2, whereas (0.6/(0.6+0.1+0.1))=75% of the first additional video recording is covering AREA 2. Moreover, the second additional video recording is covering (0.05/(0.05+0.6+0.1))≈6.6% of AREA 2, and the third additional video recording is covering 0% of AREA 2. Accordingly, the first additional video recording covers the biggest portion of the subarea having the currently highest interest level based on the processed video contents of the overview video recording. Using said interest threshold criterion, the first additional video recording is deemed to be more relevant than the overview video recording, and the currently highest interest level is thus seen to satisfy the interest threshold criterion.

Hence, to summarize, the back-end video production unit 44 is adapted to produce a recommended video production 80 by processing video contents of the overview video recording and selecting video contents between either one of the overview video recording or the additional video recording(s), based on camera coverage of the respective recordings. The recommended video production 80 can in this embodiment thus advantageously be produced without necessarily having to process the individual additional video recording(s) (i.e. by applying image processing algorithms onto the video contents of the overview video recording, but not onto the video contents of the additional video recording(s)).

In embodiments of the present disclosure, one or more additional video cameras 15 a-n may be adapted to output pan-tilt-zoom (PTZ) data onto the data network 30, wherein the back-end video production unit 44 is configured to receive said PTZ data. The PTZ data enables the video production unit 44 to be aware of exact positions, orientations, fields of view, etc., of the respective additional video cameras 15a-n. Accordingly, the video production unit 44 may select video contents and/or produce the recommended video production 80 without having to analyze the additional video recording(s) (i.e. without knowing the actual camera coverage).

With reference to FIGS. 3a-e, an embodiment of video content selection based on subarea interest level is shown. Compared to the embodiments described with reference to FIG. 2, the back-end video production unit 44 is in this embodiment configured to determine interest levels of subareas by processing video contents of the additional video recording(s). Alternatively, at least one of the one or more additional video cameras 15a-n comprises an edge computing unit. Edge computing is in this sense referring to that computations occur closer to the location to where the recording is captured, i.e. the additional video cameras 15a-n rather than the system back-end 40. The edge computing unit is configured to determine the interest level of the subarea covered by the associated additional video camera 15 by processing video contents of the associated additional video recording. In either way, the processing of video contents, using e.g. the image processing unit as has been previously explained, is directed at the additional video recordings.

Figure 3A:
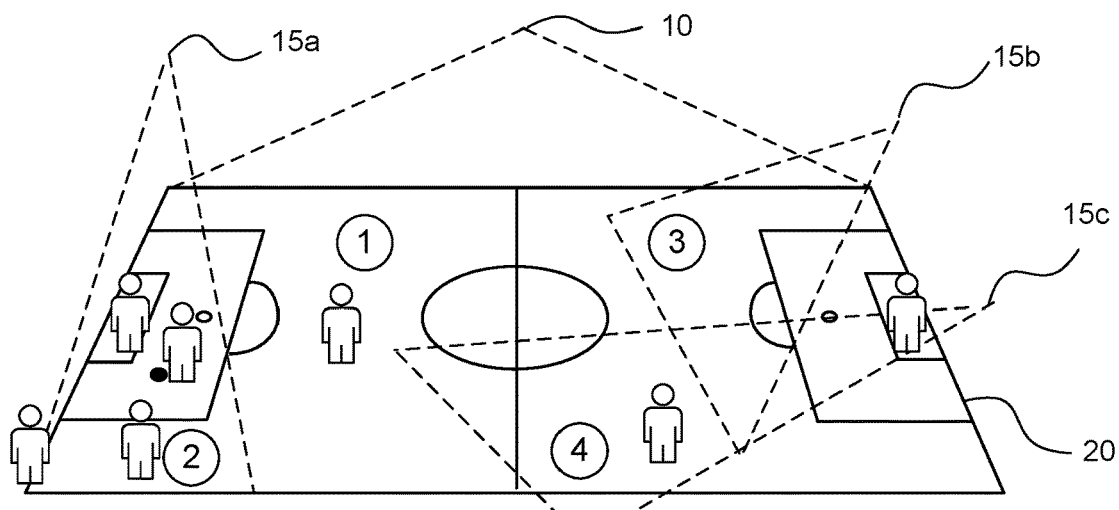
FIGS. 3a-e are illustrative images for providing a recommended video production according to one embodiment.
Figure 3B:
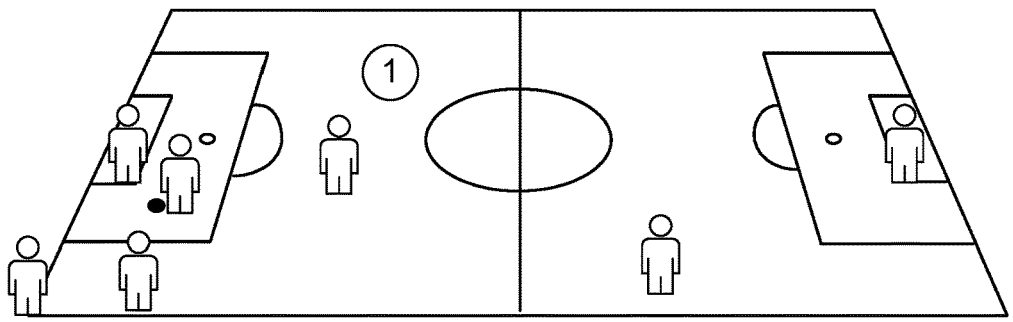
Figure 3C:
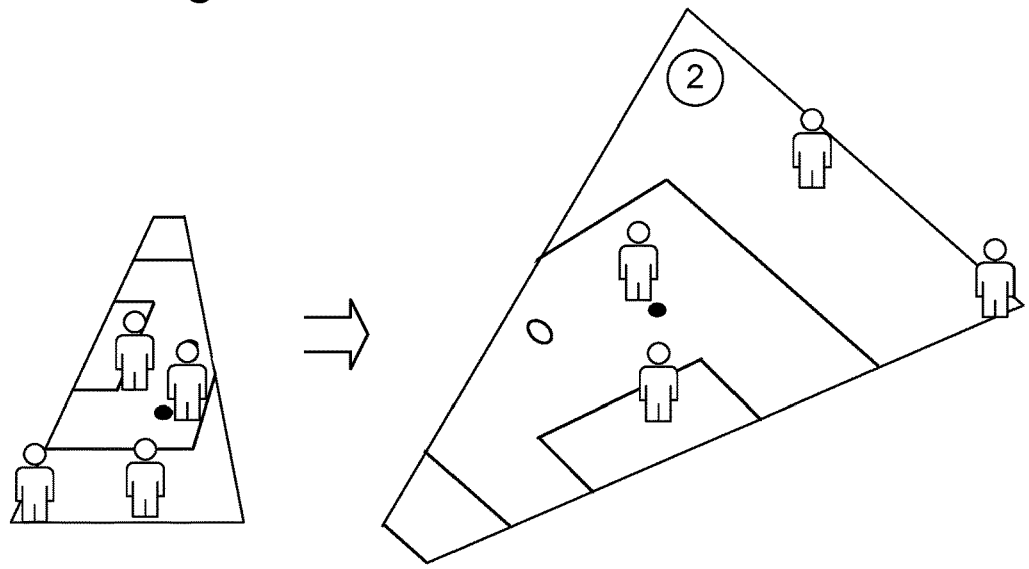
Figure 3D:
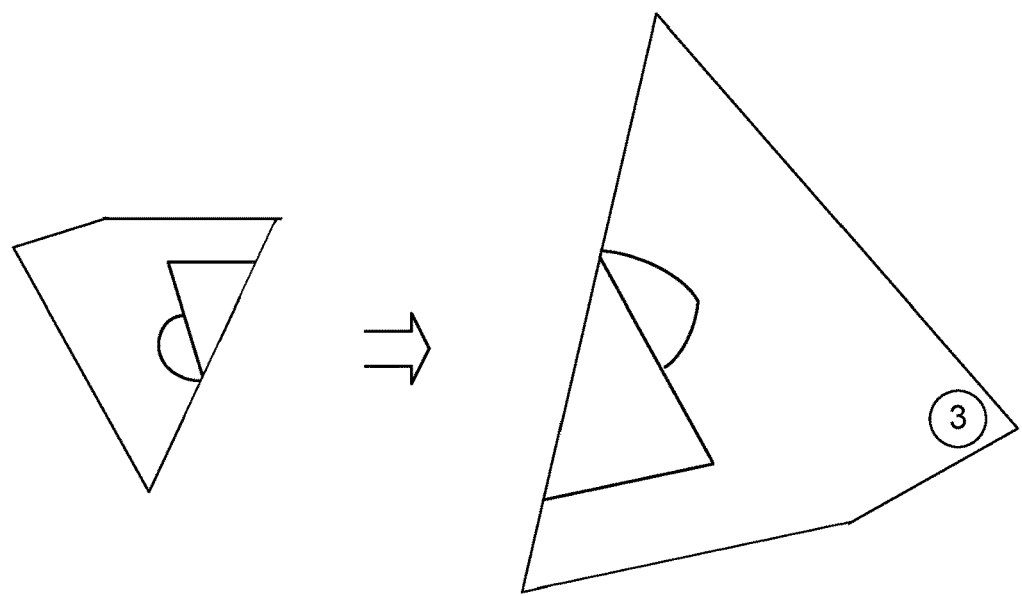
Figure 3E:
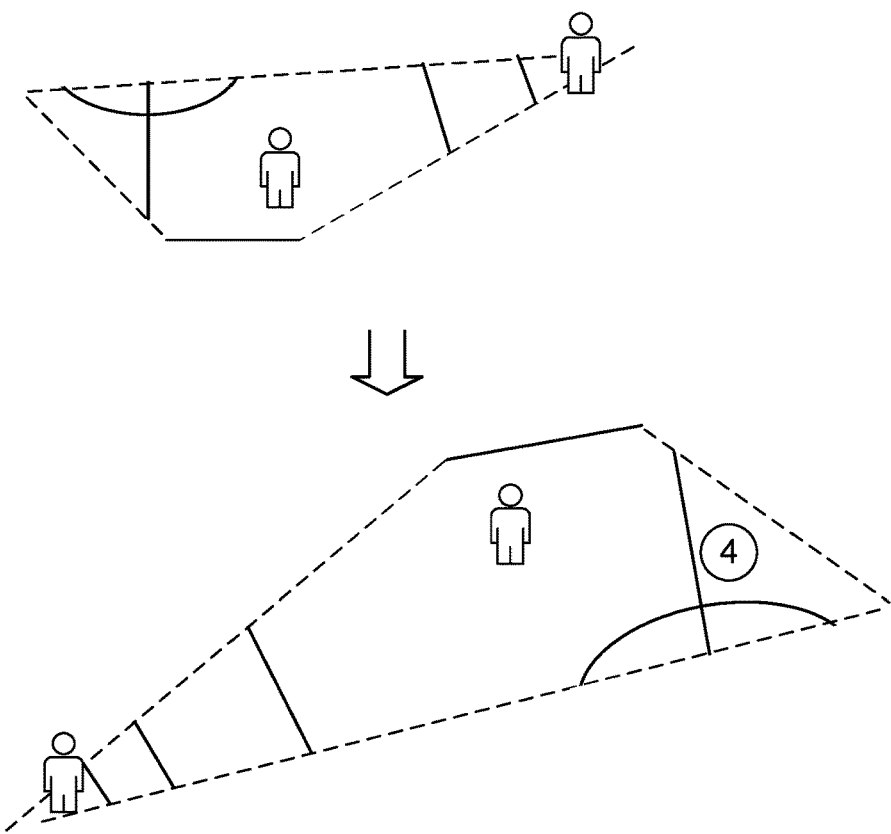

In FIG. 3a, a real-world target field 20 is depicted. The system 100 comprises an overview video camera 10, and a first 15a, second 15b, and third 15c additional video camera, each one being adapted to cover different subareas of the real-world target field 20. As seen in FIGS. 3b-e, the back-end video production unit 44 is configured to receive four different video recordings. In this embodiment, however, the additional video recordings shown in FIGS. 3c-e are being processed for determining subareas of interest. As is apparent from the images, the video recordings selected for production are shown with respect to the camera view of the associated additional video camera 15a-c. Video contents reflecting the currently highest interest level may therefore be shown from a variety of different angles, perspectives, orientations and positions around the field 20, depending on the associated additional video camera 15a-c. The concept of providing an interest threshold criterion for selection of video contents may be realized similarly to the embodiment described with reference to FIG. 2, with the difference that the subareas of interest are determined by processing the additional video recording(s). Accordingly, the subareas of interest in FIGS. 3a-e are typically different from the AREAS 1-5 in FIG. 2.

Hence, to summarize, the back-end video production unit 44 is adapted to produce a recommended video production 80 by processing video contents of the additional video recordings and selecting video contents among either one of the overview video recording or the additional video recording(s), based on camera positions and orientations of the additional video cameras 15a-n having captured the respective additional recordings. The recommended video production 80 can in this embodiment thus be produced without having to process the overview video recording (i.e. by applying image processing algorithms onto the video contents of the additional video recordings).

In embodiments of the present disclosure, either one of the techniques described with reference to FIG. 2 or FIGS. 3a-e can be realized in conjunction with one another. Selection of video contents among the overview video recording and the additional video recording(s) can thus be performed by either one or a combination of, for instance, processing the additional video recording(s) or the overview video recording, considering PTZ data, providing edge computing units in the additional camera(s) 15a-n, calculating different subareas of interest, providing different interest threshold criteria, and so forth. The technique to select video contents may also vary over time provided that, for each time unit, the recommended video production 80 preferably comprises video contents that reflect the currently highest interest level.

Figure 4:
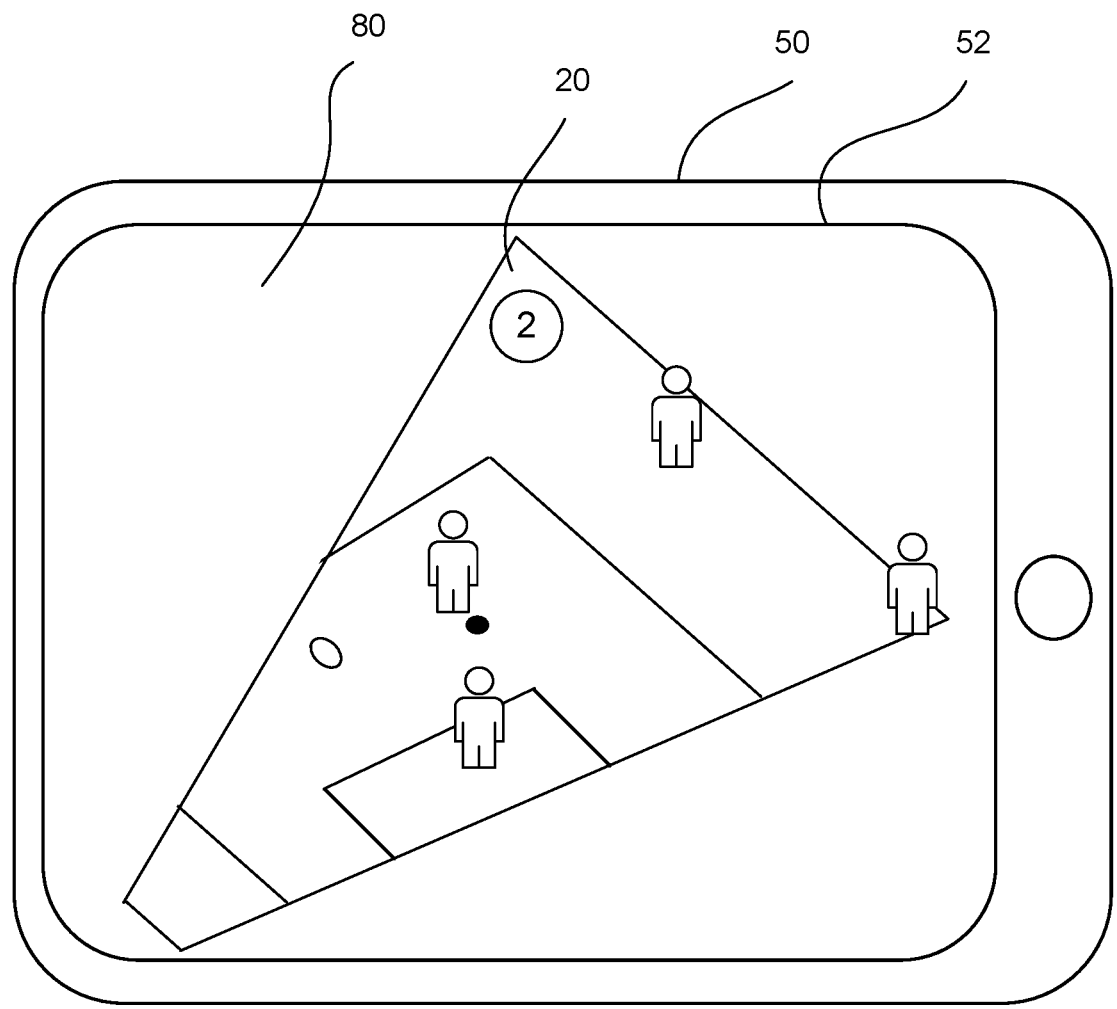
FIG. 4 is a schematic front view schematically illustrating the interface of a client device according to an embodiment.
Figure 5:
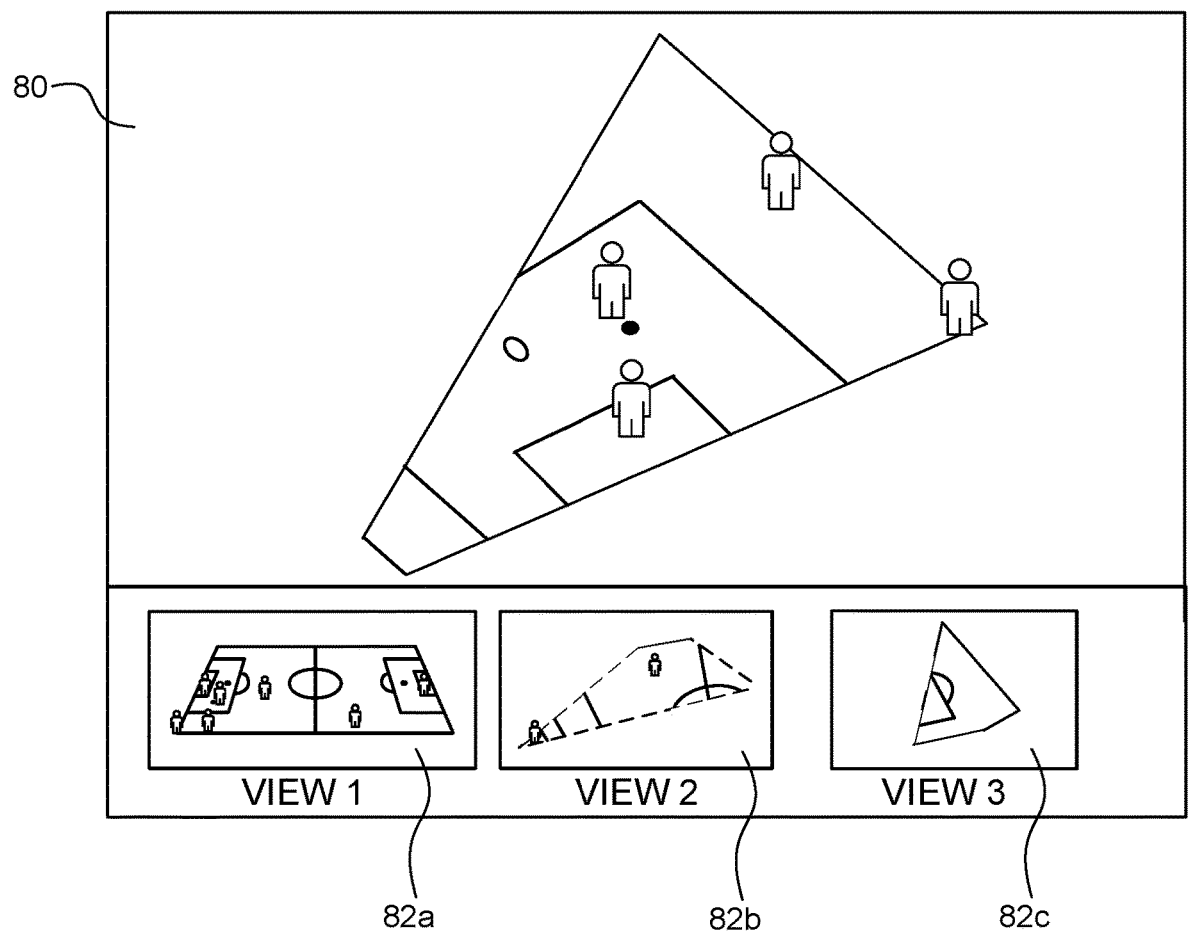
FIG. 5 is a schematic front view schematically illustrating the interface of a client device according to an embodiment.
Figure 6:
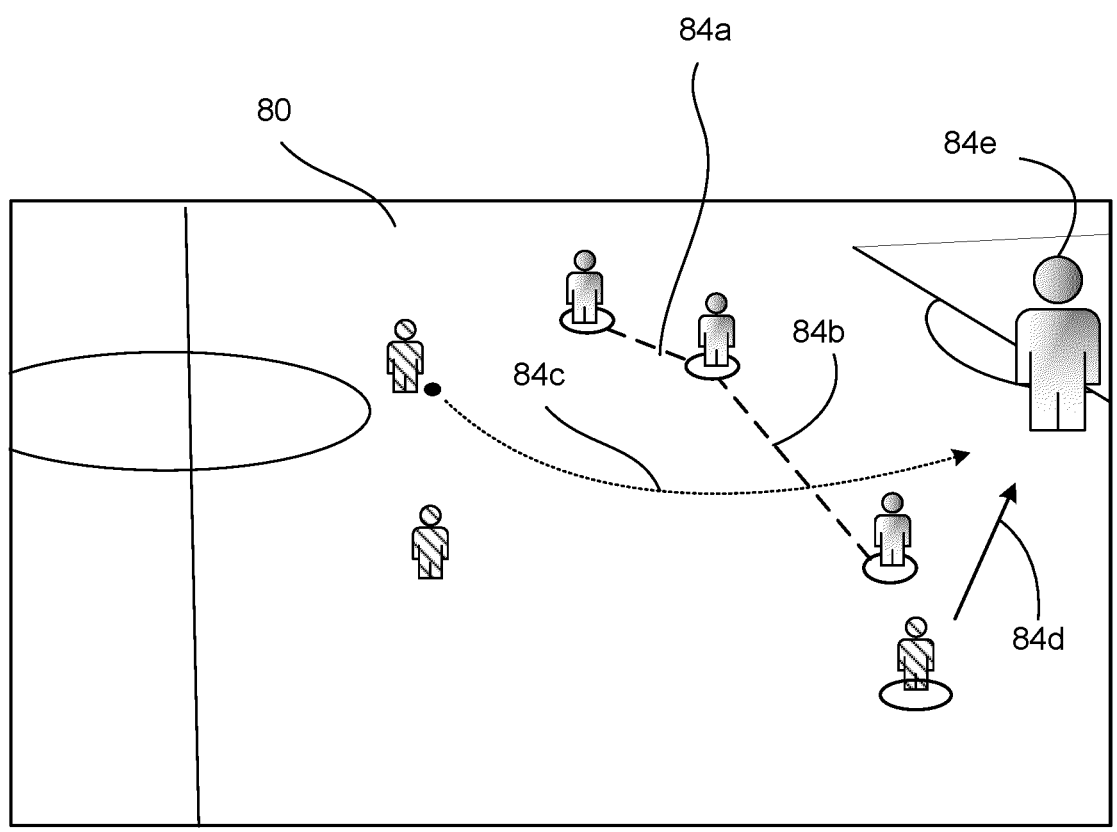
FIG. 6 is an illustrative image of a recommended video production according to one embodiment.

With reference to FIGS. 4, 5 and 6, embodiments of a client device 50 playing a recommended video production 80 is shown.

As seen in FIG. 4, the recommended video production 80 comprises video contents that, for each time unit, represent the currently most interesting subarea of the real-world target field 20. In the shown example, the currently most interesting subarea is the subarea from FIG. 3c that contains video contents reflecting four players and a ball. Over time, the display 52 will present different video contents, due to the video production unit 44 having selected different video recordings to be used for the recommended video production 80.

In embodiments exemplified by FIG. 5, the additional video production unit 444 may be configured to produce one or more additional video productions. Specifically, in FIG. 5, an embodiment is shown wherein three additional video productions 82a-c have been produced. The additional video productions 82a-c may be produced generally in accordance with the present disclosure, with the difference that the additional productions 82a-c do not comprise video contents reflecting the currently highest interest level. Accordingly, the additional video productions 82a-c may comprise video contents originating from e.g. the second, third or fourth most interesting subarea of the field 20. A user (not shown) of the associated client device 50 may thus be given the choice of choosing a view that he or she desires to watch, rather than being fed with the system's 100 recommended video production 80. The other productions 82a-c will consequently show a different video recording than the video recording currently shown in the recommended video production 80. In FIG. 5, the additional productions 82a-c are shown as thumbnails (VIEW 1, VIEW 2 and VIEW 3) that the user may choose from. Other techniques for selecting between the additional productions 82a-c may alternatively be realized.

With reference to FIG. 6, the recommended video production 80 is streamed as a different production format. Different production formats may be streamed to the client devices 50a-n depending on the interest levels of subareas of the real-world target field 20. For instance, if the interest level is currently very low in all of the recordings, such as during an intermission, injury break, time out, etc., a rerun production of a previously occurring interesting event may be shown once again. A wide variety of different types of production formats may be provided. For instance, different production formats include a normal production, a rerun production (of a previously interesting event), a highlight production (e.g. of particularly interesting events), an augmented production (e.g. with statistics, graphical markings, alternating production speeds), a commentary production, or a special events production.

In FIG. 6, the recommended video production 80 is streamed as an augmented production. In this particular example, several graphical markings 84a-e is augmenting the video production 80. For instance, the arrows 84c and 84d indicate how the attacking (striped) team is to approach the penalty box area of the defending (shaded) team. The goalkeeper of the defending team has had its size increased substantially at 84e, to highlight the player. Moreover, lines at 84a and 84b are illustrating the offside line of the defending team. The graphical markings 84a-e may alternatively be shown as any type of marking known in the art for augmenting the recommended video production 80.

FIG. 7 shows a flowchart diagram of a method 200 for providing a recommended video production 80. The steps 210, 220, 230, 235, 240 and 250 of the method 200 are to be performed generally by a system 100 according to foregoing embodiments described in the present disclosure.

Further alternative aspects of the present disclosure are described in the following numbered clauses.

Clause 1: A system (100) for providing a recommended video production (80), comprising: an overview camera (10) being adapted to capture an overview video recording of a real-world target field (20), and to output said overview video recording onto a data network (30); one or more additional video cameras (15a-n), wherein each additional video camera (15) is adapted to capture an additional video recording covering a subarea of the real-world target field (20), and to output said additional video recording onto the data network (30); and a back-end video production unit (44) being connected to the data network (30), and configured to: receive the overview video recording captured by the overview camera (10) and the additional video recording(s) captured by the one or more additional video cameras (15a-n), wherein video contents of the overview video recording are synchronized in time with video contents of the additional video recording(s), select video contents among the overview video recording and the additional video recording(s), said selection being determined by interest levels of subareas of the real-world target field (20), said interest levels being associated with real-world events occurring within and around said subareas of the real-world target field (20), and based on said selection, produce the recommended video production (80) that, for each time unit, comprises video contents reflecting a currently highest interest level among the overview video recording and the additional video recording(s).

Clause 2: A method (200) for providing a recommended video production (80), comprising: capturing (210) an overview video recording of a real-world target field (20), and outputting said overview video recording onto a data network (30); capturing (220) one or more additional video recordings that cover a subarea of the real-world target field (20), and outputting said one or more additional video recordings onto the data network (30); receiving (230), from the data network (30), the overview video recording and the additional video recording(s), wherein video contents of the overview video recording are synchronized in time with video contents of the additional video recording(s); selecting (240) video contents among the overview video recording and the additional video recording(s), said step of selecting (240) being determined by interest levels of subareas of the real-world target field (20), said interest levels being associated with real-world events occurring within and around said subareas of the real-world target field (20), and based on said step of selecting (240), producing (250) the recommended video production (80) that, for each time unit, comprises video contents reflecting a currently highest interest level among the overview video recording and the additional video recording(s).

The system has mainly been described above with reference to a few embodiments. However, as is readily appreciated by a person skilled in the art, other embodiments than the ones disclosed above are equally possible within the scope of the claimed invention, as defined by the appended patent claims.

The invention claimed is:

1. A system for providing a recommended video production, comprising:
an overview camera being adapted to capture an overview video recording of a real-world target field, and to output said overview video recording onto a data network;
one or more additional video cameras, wherein each additional video camera is adapted to capture an additional video recording covering a subarea of the real-world target field, and to output said additional video recording onto the data network, wherein the overview video camera is different from the one or more additional video cameras; and
a back-end video production unit being connected to the data network, and configured to:
receive the overview video recording captured by the overview camera and the additional video recording captured by the one or more additional video cameras, wherein video contents of the overview video recording are synchronized in time with video contents of the additional video recording,
apply one or more image processing algorithms to the overview video recording for determining interest levels of subareas of the real-world target field, said one or more image processing algorithms analyzing pixels of digital images of the overview video recording for retrieving information relating to scene occurrences of real-world events occurring within and around said subareas of the real-world target field,
select video contents among the overview video recording and the additional video recording, said selection being based on the interest levels as defined by the processed overview video recording, and
based on said selection, produce the recommended video production that, for each time unit, comprises video contents reflecting a currently highest interest level among the overview video recording and the additional video recording,
wherein the back-end video production unit is configured to select video contents by:
upon the currently highest interest level satisfying an interest threshold criterion, selecting video contents of the additional video recording that covers the biggest portion of the subarea having the currently highest interest level based on said processed video contents of the overview video recording, and
upon the currently highest interest level not satisfying the interest threshold criterion, selecting video contents of the overview video recording.

2. The system according to claim 1, wherein at least one of the additional video cameras is adapted to output pan-tilt-zoom (PTZ) data onto the data network, wherein the back-end video production unit is configured to receive the PTZ data, thereby enabling the video production unit to be aware of a position, an orientation, and a field of view for the associated additional video camera.

3. The system according to claim 1, wherein the back-end video production unit is configured to determine interest levels of subareas of the real-world target field by processing video contents of the additional video recording.

4. The system according to claim 1, wherein at least one of the one or more of the additional video cameras comprises an edge computing unit, wherein the edge computing unit is configured to determine the interest level of the subarea covered by the associated additional video camera by processing video contents of the associated additional video recording.

5. The system according to claim 1, wherein the back-end video production unit is configured to store or buffer the recommended video production in a back-end video storage unit, and wherein the system further comprises:
   a back-end video streaming unit being configured to stream the recommended video production onto the data network; and
   a plurality of client devices being adapted to receive and present, on a display of each client device, the recommended video production.

6. The system according to claim 5, wherein the back-end video streaming unit is configured to stream the recommended video production in different production formats based on the interest level of subareas of the real-world target field, each different production format being one of:
   a normal production,
   a rerun production,
   a highlight production,
   an augmented production,
   a commentary production, or
   a special events production.

7. The system according to claim 5, wherein the back-end video production unit is configured to produce one or more additional video productions, wherein the back-end video streaming unit is configured to stream the one or more additional video productions onto the data network, and wherein the plurality of client devices are adapted to receive and present the one or more additional video productions on a display of each client device upon a user thereof having selected said one or more additional video productions for display.

8. The system according to claim 1, wherein the one or more additional cameras are adapted to be activated, automatically aligned, or deactivated based on the interest level of the subarea covered by the associated additional video camera.

9. The system according to claim 1, wherein the one or more additional cameras are adapted to adjust a capture resolution based on the interest level of the subarea covered by the associated additional video camera.

10. The system according to claim 1, wherein the back-end video production unit is configured to provide capture accuracy feedback to the one or more additional video cameras through the data network.

11. The system according to claim 1, wherein said one or more image processing algorithms involve providing a scoring scheme for said real-world events occurring within and around said subareas of the real-world target field.

12. A method for providing a recommended video production, comprising:
   capturing an overview video recording of a real-world target field, and outputting said overview video recording onto a data network;
   capturing one or more additional video recordings that cover a subarea of the real-world target field, and outputting said one or more additional video recordings onto the data network;
   receiving, from the data network, the overview video recording and the additional video recording, wherein video contents of the overview video recording are synchronized in time with video contents of the additional video recording;
   applying one or more image processing algorithms to the overview video recording for determining interest levels of subareas of the real-world target field, said one or more image processing algorithms analyzing pixels of digital images of the overview video recording for retrieving information relating to scene occurrences of real-world events occurring within and around said subareas of the real-world target field;
   selecting video contents among the overview video recording and the additional video recording, said step of selecting being based on the interest levels as defined by the processed overview video recording, wherein:
      upon the currently highest interest level satisfying an interest threshold criterion, selecting video contents of the additional video recording that covers the biggest portion of the subarea having the currently highest interest level based on said processed video contents of the overview video recording, and
      upon the currently highest interest level not satisfying the interest threshold criterion, selecting video contents of the overview video recording, and
   based on said step of selecting, producing the recommended video production that, for each time unit, comprises video contents reflecting a currently highest interest level among the overview video recording and the additional video recording(s).

* * * * *